United States Patent [19]
Saito

[11] Patent Number: 4,652,288
[45] Date of Patent: Mar. 24, 1987

[54] METHOD OF PRODUCING INFRARED IMAGE GUIDE

[75] Inventor: Mitsunori Saito, Kyoto, Japan

[73] Assignee: Horiba, Ltd., Kyoto, Japan

[21] Appl. No.: 758,079

[22] Filed: Jul. 23, 1985

[30] Foreign Application Priority Data

Aug. 4, 1984 [JP] Japan ................................ 59-164686
Apr. 4, 1985 [JP] Japan .................................. 60-71704

[51] Int. Cl.$^4$ ..................... C03B 37/02; C03B 37/028
[52] U.S. Cl. ........................................ 65/3.11; 65/3.43;
65/3.44; 65/4.21; 65/4.2; 65/DIG. 15;
65/DIG. 16; 264/1.5; 156/86; 156/309.6
[58] Field of Search ..................... 156/86, 309.6, 229,
156/166, 244.12, 244.13; 350/96.33, 96.25;
264/1.5, 1.6; 65/3.11, 3.43, 3.44, 4.2, 3.4, 4.21,
4.3, DIG. 15, DIG. 16

[56] References Cited

U.S. PATENT DOCUMENTS

| 3,190,735 | 6/1965 | Kapany ................................... 65/4.2 |
| 3,253,846 | 5/1966 | Woodcock ....................... 156/166 X |
| 3,823,996 | 7/1974 | Kompfner ....................... 350/96.33 |
| 3,920,312 | 11/1975 | Siegmond ........................ 65/3.11 X |
| 4,300,816 | 11/1981 | Snitzer ............................. 350/96.33 |

FOREIGN PATENT DOCUMENTS

| 56-45837 | 4/1981 | Japan ........................... 65/DIG. 15 |
| 59-03039 | 1/1984 | Japan ........................... 65/DIG. 16 |
| 59-29208 | 2/1984 | Japan ........................... 65/DIG. 16 |

*Primary Examiner*—Kenneth M. Schor
*Attorney, Agent, or Firm*—Wenderoth, Lind & Ponack

[57] ABSTRACT

A chalcogenide glass rod and/or a fluoride glass rod are covered with a thermally shrinkable synthetic resin tube, the resulting assembly being heated under vacuum to produce a preform, and a thermally shrinkable synthetic resin tube with a plurality of said preforms formed in a bundle and inserted thereinto is drawn again under heating.

2 Claims, 17 Drawing Figures

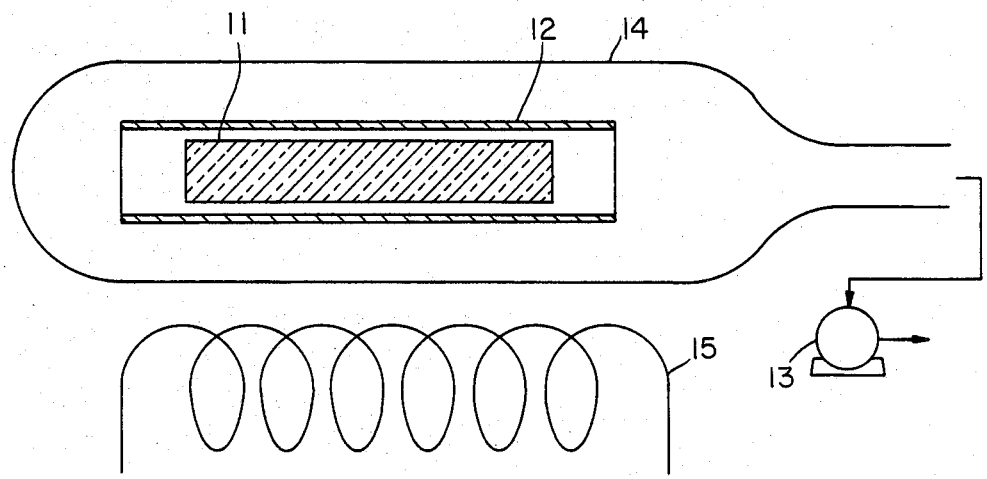
FIG. 9
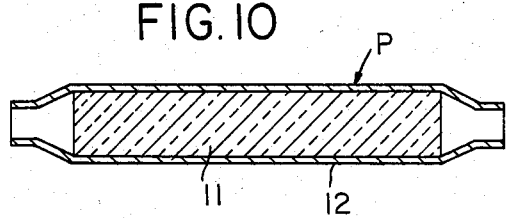
FIG. 10
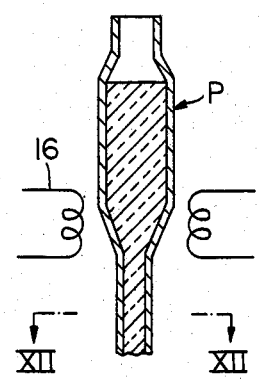
FIG. 11
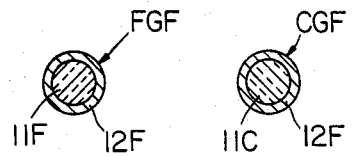
FIG. 12A
FIG. 12B

METHOD OF PRODUCING INFRARED IMAGE GUIDE

BACKGROUND OF THE INVENTION

1. Field of the Invention

The present invention relates to a method of producing an infrared image guide for use in instrumentation, medicine and the like.

2. Description of the Prior Art

The conventional infrared image guide has been produced by a method wherein a glass rod made of chalocogenide glass including arsenic sulfide and germanium sulfide, fluoride glass and the like is inserted into a synthetic resin tube, the resulting assembly being drawn under heating to produce an infrared fiber provided with a cladding formed of the synthetic resin tube around a glass core, and a plurality of such infrared fibers being adhesively bound in turn with tuning the arrangement phase of both ends thereof to each other.

It is, however, remarkably difficult to closely insert a glass rod into a synthetic resin tube. The generation of voids between the glass rod and the synthetic resin tube is inevitable. Thus, the conventional method had shown a disadvantage in that bubbles resulting from said voids are generated in the infrared fiber whereby the strength and optical characteristics of the infrared fiber are reduced.

In addition, the drawn infrared fiber per se has a remarkably small strength and the cladding is prone to be damaged, so that the operation for tying infrared fibers up in a bundle is inferior in productivity and besides, it is most difficult to exactly tune the phase of both ends of the infrared fibers, that is to say the larger the number of the infrared fibers is, the smaller the diameter of the core is, or the longer the infrared image guide is, the more difficult it is to tune the phase. It is not too much to say that only infrared image guides having a smaller number of bundled infrared fibers and a larger diameter of a core can be really produced.

SUMMARY OF THE INVENTION

The present invention aims at the elimination of the above described disadvantages. Thus, it is an object of the present invention to provide a method of producing an infrared image guide easily in a simple manner under the easy operational condition even though the infrared image guide has a larger core number or a larger core diameter.

In order to achieve the above described object, a method of producing an infrared image guide according to the present invention is characterized in that a first thermally shrinkable synthetic resin tube with a glass rod inserted into the inside thereof is heated under vacuum to produce a preform with said first synthetic resin tube adhered to the surface of said glass rod, a plurality of the resulting preforms or fibers obtained by drawing said preforms being inserted into a second thermally shrinkable synthetic resin tube and then said second synthetic resin tube being heated to produce a bundled preform in which a plurality of said preforms or fibers were tied up in a bundle by the thermal shrinkage of said second synthetic resin tube, and the resulting bundled preform being drawn under heating to produce an infrared image guide having a plurality of glass cores within said first and second synthetic resin tubes formed as cladding.

Referring now to the above described characteristic construction, an infrared image guide is produced by tying a plurality of preforms having a first synthetic resin tube adhered to the surface of a glass rod or fibers obtained by drawing said preforms up in a bundle and then drawing the resulting bundle, so that the operation is easy since an article, which is comparatively large in shape, is handled whereby it is very easy to tune with high accuracy the arrangement position of both ends of the preforms or fibers. Accordingly, it is easy to even produce an infrared image guide having a larger number of cores, a smaller core diameter or a larger length.

In the production of said preform a first synthetic resin tube with a glass rod inserted thereinto is thermally shrunk under vacuum, so that the adhesion of the first synthetic resin tube to the surface of the glass rod can be increased, and further, in the drawing of a bundled preform the first and second synthetic resin tubes are softened to fill up a gap between glass rods and between glass cores, so that a mechanically strong infrared image guide without containing bubbles in the clads, that is to say the disadvantages incidental to the conventional methods can be completely eliminated by a simply improved method.

BRIEF DESCRIPTION OF THE DRAWINGS

FIGS. 1 to 8 show one procedure of a method of producing an infrared image guide according to the present invention, in which FIG. 1 is a sectional view showing the production of a preform;

FIG. 2 is a sectional view showing a preform;

FIG. 3 is a sectional view showing the producting of fibers by drawing under heating;

FIG. 4 is the sectional view showing a fiber of FIG. 3 taken along a line IV—IV thereof;

FIG. 5 is a sectional view showing the production of a bundled preform;

FIG. 6 is a sectional view showing the bundled preform;

FIG. 7 is a sectional view showing the drawing of the bundled preform; and

FIG. 8 is a sectional view showing an infrared image guide of FIG. 7 taken along a line of VIII—VIII thereof.

FIGS. 9 to 16 show another preferred embodiment of the present invention, in which FIG. 9 is a sectional view showing production a preform;

FIG. 10 is a sectional view showing a preform;

FIG. 11 is a sectional view showing the production of a fiber by drawing under heating;

FIG. 12 is a sectional view showing a fiber of FIG. 11 taken along a line XII—XII thereof;

FIG. 13 is a sectional view showing the production of a bundled preform;

FIG. 14 is a sectional view showing a bundled preform;

FIG. 15 is a sectional view showing the drawing a bundled preform; and

FIG. 16 is a sectional view showing a bundled fiber of FIG. 15 taken along a line XVI—XVI thereof.

DESCRIPTION OF THE PREFERRED EMBODIMENTS

Figure 1:
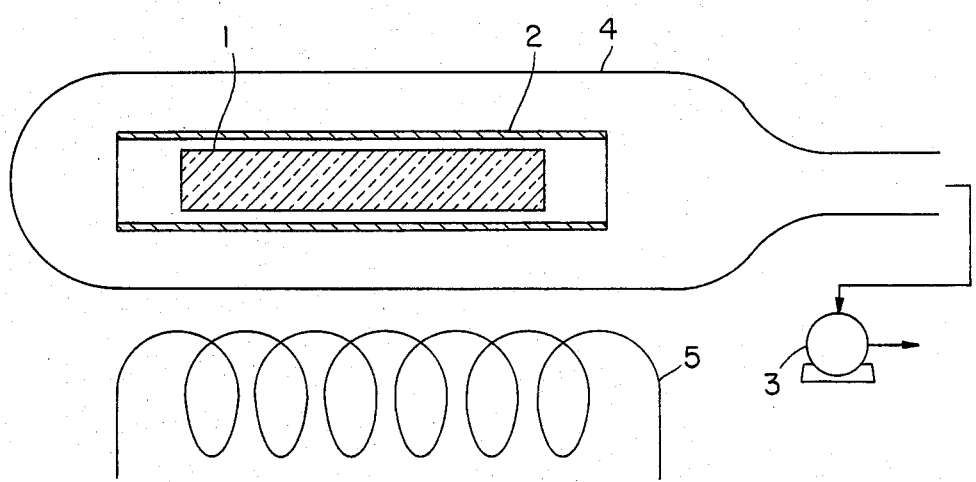

A method of producing an infrared image guide according to the present invention is below described with reference to the drawings. As shown in FIG. 1, a glass rod 1 made of chalcogenide glass, fluoride glass and the like is inserted into a first thermally shrinkable synthetic resin tube 2 made of for example tetrafluoroethylene resin (TFE), copolymer resin of tetrafluoroethylene and hexafluoropropylene (FEP) and the like and the resulting assembly is placed in a vacuum vessel 4 with which a vacuum pump 3 and the like are connected.

Figure 2:
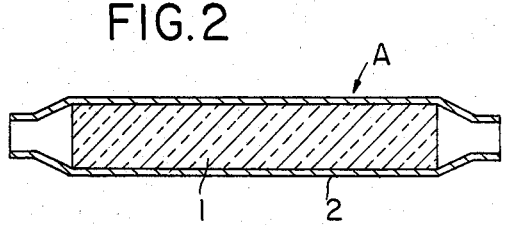

Subsequently, the vacuum vessel 4 is subjected to heating by a heater 5 while it is under vacuum to make the first synthetic resin tube 2, into which the glass rod 1 was inserted, thermally shrink under vacuum, as shown in FIG. 2, whereby a preform A having said first synthetic resin tube 2 adhered to the surface of the glass rod 1 is produced.

Figure 3:
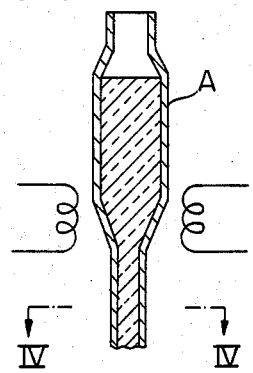
Figure 4:
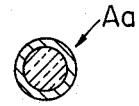

Then, as shown in FIG. 3, said preform A is subjected to drawing in accordance with requirements such as the attainment of an infrared image guide including the glass rod 1 having a larger diameter or a core having a remarkably smaller diameter under heating to produce a fiber Aa having said glass rod 1 as a core 1a and said synthetic resin tube 2 as a clad 2a, as shown in FIG. 4.

A method of producing an infrared image guide from said fiber Aa will be below described.

Figure 5:
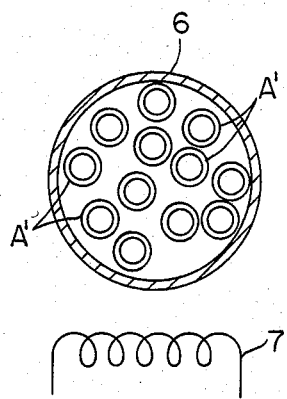
Figure 6:
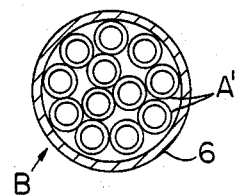

As shown in FIG. 5, the desired number of pieces of said fiber Aa are inserted into a second thermally shrinkable synthetic resin tube 6 and said second synthetic resin tube 6 is heated by a heater 7 to produce a bundled preform B, in which said desired number of pieces of fiber Aa are formed in a bundle, by thermal shrinkage of said second synthetic resin tube 6, as shown in FIG. 6.

Figure 7:
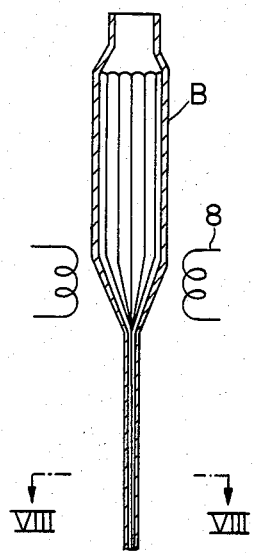
Figure 8:
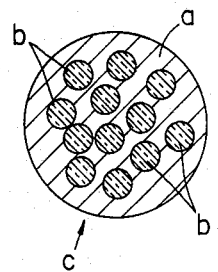

Subsequently, as shown in FIG. 7, said bundled preform B is drawn from one end side thereof under heating by a heater 8 to produce an infrared image guide C having said first and second synthetic resin tubes 2, 6 as a cladding a and a plurality of glass cores b therein, as shown in FIG. 8.

Since the first synthetic resin tube 2 is thermally shrunk under vacuum, the adherence of said first synthetic resin tube 2 to the glass rod 1 is remarkably high whereby bubbles are prevented from being generated.

Since in drawing of the bundled preform B, said first and second synthetic resin tubes 2 are softened whereby the gaps between the preforms A are filled with said first and second synthetic resin tubes, bubbles can be prevented from being generated within the infrared image guide C.

In addition, the drawing of said preform A under heating may be carried out if the need arises. For example, in the case where the glass rod 1 has an increased length and a smaller diameter, the drawing under heating may be omitted.

However, a bundled fiber, which simultaneously includes visible fibers pervious to only visible rays and infrared fibers pervious to only infrared rays, (for example see Japanese Patent Application Laid-Open No. 93008/1983) has been known as a bundled fiber capable of simultaneously transmitting visible rays (about 0.4 μm to about 0.8 μm) and infrared rays (0.8 μm or more).

However, since a suitable number of visible fibers and infrared fibers are merely formed in a bundle in the above described bundled fiber, it has been difficult to produce a bundled fiber of high quality and strength.

Furthermore, since the conventional visible fiber and infrared fiber have used silica glass and chalcogenide glass as a core and fluorine resin such as copolymer of tetrafluoroethylene and hexafluoropropylene (hereinafter referred to as FEP) and tetrafluorethylene (hereinafter referred to as TFE) as a cladding, the problems have occurred in the following points: That is to say, silica glass has a remarkably high softening temperature of about 1500° to 2000° C. while chalcogenide glass and said fluorine resin have a comparatively low softening temperature of about 300° C., so that a difficulty has occurred in that they can not be simultaneously drawn.

In addition, since silica glass has a transmission wavelength range of about 0.4 μm to 1.8 μm, where a bundled fiber is formed of the combination of visible fibers made of silica glass and infrared fibers made of chalcogenide glass, the light having a wavelength range of 1.8 μm or more can be transmitted only through chalcogenide glass fibers and therefore such a bundled fiber had a disadvantage in that the transmission efficiency for infrared rays is low.

Accordingly, a method of producing a bundled fiber, which is capable of simultaneously transmitting visible rays and infrared rays as per in the above mentioned first preferred embodiment, will be below described with reference to FIGS. 9 to 16. However, since fluoride glass is different from calcogenide glass merely in core material, a method of producing a fluoride glass fiber will first be described.

At first, as shown in FIG. 9, a glass rod 11 as a core made of fluoride glass (for example $BaF_2$-$GdF_3$-$ZrF_4$ glass with $AlF_3$ added thereto) is inserted into a fluorine resin tube 12 (hereinafter referred to as resin tube) made of FEP or TFE or the like and the resulting assembly is housed in a vacuum vessel 14 to which a vacuum pump 13 and the like are connected.

Then, the vacuum vessel 14 is heated (to temperatures of about 100° to 200° C.) by a heater 15 to thermally shrink the resin tube 12 including the glass rod 11 inserted thereinto under vacuum, thereby producing a preform P, in which a cladding formed of the resin tube 12 covers the peripheral surface of the glass rod 11, as shown in FIG. 10.

In accordance with the requirements such as attainment of the glass rod 11 having a comparatively larger diameter and a core having a remarkably smaller diameter, as shown in FIG. 11, said preform P is drawn under heating to produce a fluoride glass fiber FGF having a fluoride glass as the core 11F and a resin tube as the cladding 12F and having a comparatively smaller diameter, as shown in FIG. 12(A). In addition, 16 designates a heater.

Since the core made of fluoride glass and the cladding formed of the resin tube have almost the same softening temperature of about 300° C., the drawing can be very smoothly carried out by the use of a simple temperature control.

Furthermore, a chalcogenide glass fiber CGF is produced from the glass rod 11 made of chalcogenide glass (for example As-S glass and As-Ge-Se glass) in the same manner as in the above described fluoride glass fiber FGF and as a result a chalcogenide glass fiber CGF having chalcogenide glass as the core 11C and a resin tube as the cladding 12F is produced. Since the core made of calcogenide glass and the cladding formed of a resin tube have almost the same softening temperature of about 300° C., the drawing can be smoothly carried out by a simple temperature control likewise in the above described case.

A fluoride glass fiber FGF and a chalcogenide glass fiber CGF can be obtained in the above described manner. Since a transmission wave length range of the former is about 0.6 μm to 4 μm while that of the latter is about 1 μm to 9 μm, that is to say they are overlapped in a range of 1 μm to 4 μm, infrared rays can be transmitted in high efficiency. In addition, a fluoride glass fiber FGF can transmit not only visible rays but also infrared rays.

Next, a procedure for producing the bundled fiber BF from the fluoride glass fiber FGF and the calcogenide glass fiber CGF, which were obtained in the above described manner, will be described.

Figure 13:
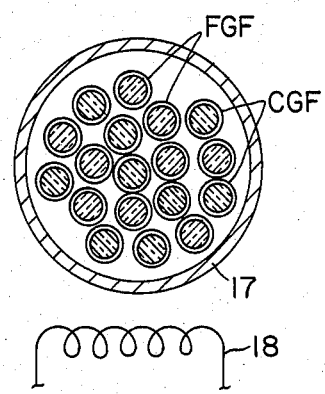
Figure 14:
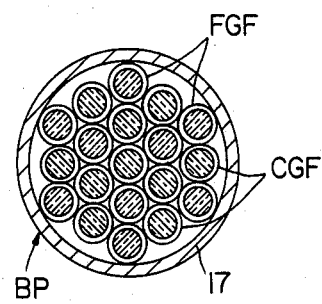

At first, as shown in FIG. 13, one or more flouride glass fibers FGF and one or more chalcogenide glass fibers CGF are inserted into the resin tube 17 and then said resin tube 17 is heated by the heater 18 (at temperatures of 100° to 200° C.) to produce the bundled preform BP comprising suitable pieces of the fluoride glass fiber FGF and the chalcogenide glass fiber CGF formed in a bundle, as shown in FIG. 14, by the thermal shrinkage of the resin tube 17.

Figure 15:
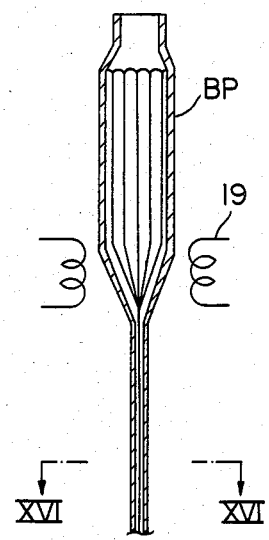
Figure 16:
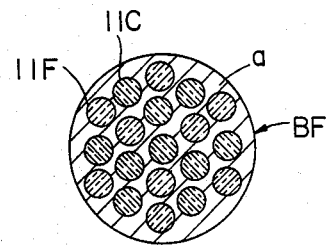

Subsequently, as shown in FIG. 15, said bundled preform BP is drawn from one end side thereof under heating by a heater 19. At this juncture, since both a cladding for the fluoride glass fiber FGF and that for the chalcogenide glass fiber CGF are formed of the resin tube 12 made of the same material as the resin tube 17, the resin tube 12 and the resin tube 17 are melted together in the drawing to produce the bundled fiber BF comprising one or more fluoride glass fibers 11F and one or more chalcogenide glass fibers 11C as cores in the cladding a in a mixed manner, as shown in FIG. 16.

As described above, fluoride glass rods and chalcogenide glass rods, which have almost the same softening temperature, are used as cores and resin tubes, which have almost the same softening temperature as that of said glass rods, are used as cladding, so that these fibers can be simultaneously drawn under heating whereby they easily produce bundled fibers.

In addition, the transmission wavelength range of fluoride glass is about 0.6 μm to 4 μm, so that flouride glass can transmit not only visible rays but also infrared rays. Furthermore, the transmission wave length range of chalcogenide glass is about 1 μm to 9 μm, so that a bundled fiber obtained by a method according to the present invention can transmit everything from visible rays to infrared rays. Accordingly, said bundled fiber can be used for the spectrometric determination for measuring absorption characteristics over a wide range including the visible range to the infrared range, that is to say a bundled fiber of this type can be remarkably improved in performance.

What is claimed is:

1. A method of producing an image guide for transmitting infrared rays which comprises:
    a. inserting a glass rod into a first thermally shrinkable synthetic resin tube to form a first assembly,
    b. heating said first assembly under vacuum to produce a preform in which said first synthetic resin tube is adhered to the surface of said glass rod,
    c. drawing the preform of step b.,
    d. inserting a plurality of drawn preforms of step c. preforms into a second thermally shrinkable synthetic resin tube to form a second assembly, where the glass rods consist of fluoride glass rods and chacogenide glass rods,
    e. heating said second assembly to produce a bundled preform, in which a plurality of said preforms of step c. are formed in a bundle, by the thermal shrinkage of said second synthetic resin tube, and
    f. drawing said bundled preform while heating to produce an infrared image guide having said first and second synthetic resin tubes as cladding and a plurality of glass cores within said cladding and wherein said first and second thermally shrinkable resin tubes are made of the same material and have substantially the same softening point as said glass rods whereby said resin tubes melt together.

2. The method of producing an image guide as set forth in claim 1 in which said first and second synthetic resin tubes are made of a fluorine resin.

* * * * *